United States Patent
Stewart

(10) Patent No.: US 6,792,154 B1
(45) Date of Patent: Sep. 14, 2004

(54) VIDEO COMPRESSION SYSTEM AND METHOD USING TIME

(75) Inventor: Ian Stewart, Carpinteria, CA (US)

(73) Assignee: World Multicast.com, Inc, Ventura, CA (US)

(*) Notice: Subject to any disclaimer, the term of this patent is extended or adjusted under 35 U.S.C. 154(b) by 563 days.

(21) Appl. No.: 09/684,803

(22) Filed: Oct. 6, 2000

Related U.S. Application Data

(60) Provisional application No. 60/158,198, filed on Oct. 7, 1999, and provisional application No. 60/158,218, filed on Oct. 7, 1999.

(51) Int. Cl.$^7$ ................................................. G06K 9/36
(52) U.S. Cl. ..................................................... 382/243
(58) Field of Search ......................... 348/473; 345/157, 345/803; 715/500.1, 501.1; 382/243, 218, 190, 154, 166, 236, 232, 233, 224, 239

(56) References Cited

U.S. PATENT DOCUMENTS

| | | | |
|---|---|---|---|
| 4,225,885 A | 9/1980 | Lux et al. | 382/239 |
| 4,651,207 A | 3/1987 | Bergmann et al. | 375/240.12 |
| 4,982,285 A | 1/1991 | Sugiyama | 375/240.12 |
| 5,265,180 A | 11/1993 | Golin | 382/236 |
| 5,282,255 A * | 1/1994 | Bovik et al. | 382/239 |
| 5,684,715 A * | 11/1997 | Palmer | 348/473 |
| 5,802,211 A * | 9/1998 | King | 382/236 |
| 5,969,764 A | 10/1999 | Sun et al. | 375/240.06 |
| 6,049,632 A | 4/2000 | Cockshott et al. | 382/239 |
| 6,055,330 A | 4/2000 | Eleftheriadis et al. | 382/154 |
| 6,057,893 A | 5/2000 | Kojima et al. | 348/700 |
| 6,075,819 A | 6/2000 | Saw | 375/240 |
| 6,094,457 A | 7/2000 | Linzer et al. | 375/240.12 |

* cited by examiner

*Primary Examiner*—Wenpeng Chen
(74) *Attorney, Agent, or Firm*—Black Lowe & Graham, PLLC

(57) ABSTRACT

A system and method for compressing a video image. The system includes an object database and a compression processor coupled to the object database for receiving video image information from a video source. The compression processor includes an image analyzer for determining status of one or more pixels of the video image over time, a shape determiner for determining a shape that defines a group of pixels that are determined to have the same status over a period of time, an object retriever for retrieving an object from the object database that corresponds to the determined shape from a stored set of objects, and a saving component for saving information relating to the selected object and dimensional information of the determined shape.

10 Claims, 6 Drawing Sheets

FIG. 4A.
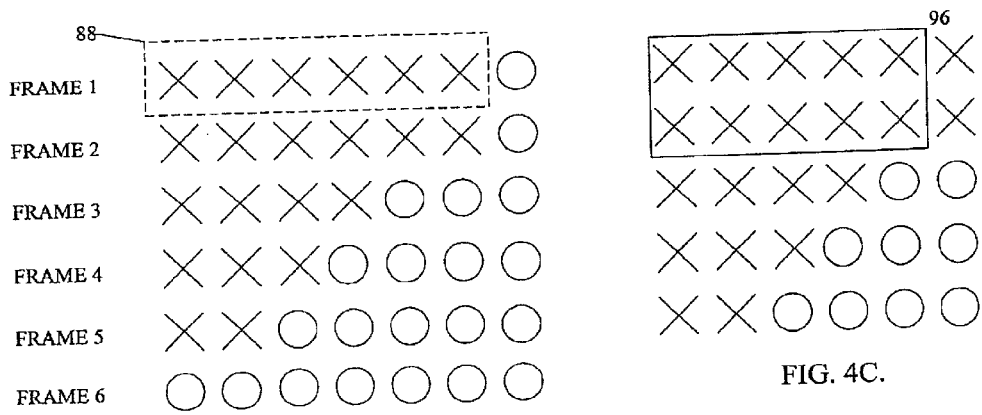
FIG. 4B.
FIG. 4C.
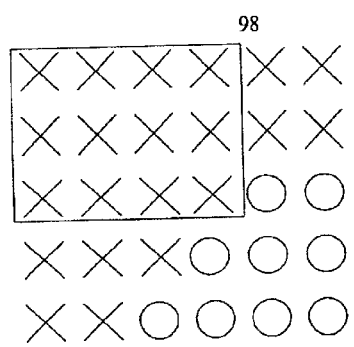
FIG. 4D.
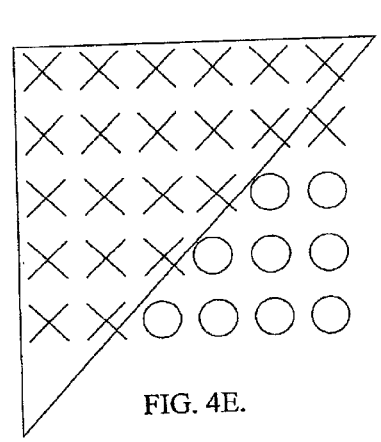
FIG. 4E.

VIDEO COMPRESSION SYSTEM AND METHOD USING TIME

PRIORITY

The present invention claim the benefit of U.S. Provisional Application No. 60/158,198 and U.S. Provisional Application No. 60/158,218, both filed Oct. 17, 1999.

FIELD OF THE INVENTION

The present invention relates to digital video and more particularly to improved video compression techniques.

BACKGROUND OF THE INVENTION

Many digital image compression techniques have been developed for allowing efficient storage and transmission of uncompressed images. Some of these compression techniques for static images are Graphic Information Files (GIF), Tagged Information Format Files (TIFF) and Joint Picture Experts Group (JPEG). A compression technique for video images is Motion Picture Experts Group (MPEG), which comprises a series of compression schemes that are a modified version of JPEG. MPEG is a flat compression scheme—each frame of the video is compressed like an individual picture.

MPEG, like other video compression schemes, still generates compressed files that require a large amount of bandwidth for delivery over a network. A short video segment may take several minutes to download. This is the reason why moderately sized videos are not readily available over the Internet.

Therefore there exists a need for a compression scheme that provides great improvement over present methods, thereby improving the effectiveness of video image reception over the Internet.

SUMMARY OF THE INVENTION

The present invention provides a system and method for compressing a video image. The system includes an object database and a compression processor coupled to the object database for receiving video image information from a video source. The compression processor includes an image analyzer for determining status of one or more pixels of the video image over time, a shape determiner for determining a shape that defines a group of pixels that are determined to have the same status over a period of time, an object retriever for retrieving an object from the object database that corresponds to the determined shape from a stored set of objects, and a saving component for saving information relating to the selected object and dimensional information of the determined shape.

In accordance with further aspects of the invention, the system further includes a transmission component for transmitting the saved information to one or more receiving systems across a network.

In accordance with other aspects of the invention, the compression processor further includes an object store message generator for generating an object store message, if no object corresponds to the determined shape, and wherein the transmission component transmits the generated object store message to the one or more receiving systems across a network.

In accordance with still further aspects of the invention, the determined shape and objects in the stored set of objects are two or three-dimensional.

In accordance with yet other aspects of the invention, a system for decompressing a video image compressed in accordance with the compression scheme of the present invention is provided. The decompressing system includes an object database, a display processor, a display coupled to the display processor, and a decompression processor coupled to the object database and the display processor. The decompression processor includes a retrieving component for retrieving an object stored in the object database that corresponds to an identifier included in the compressed video image, a scaling component for scaling the retrieved object according to scaling information included in the compressed video image, and an instructing component for instructing a display processor according to the scaled object.

As will be readily appreciated from the foregoing summary, the invention provides a new and improved video image compression scheme for efficient video image transmission.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 4A–E are illustrative examples of the compression technique in two-dimensions performed on a portion of a video image over time;

DETAILED DESCRIPTION OF THE PREFERRED EMBODIMENT

Figure 1:
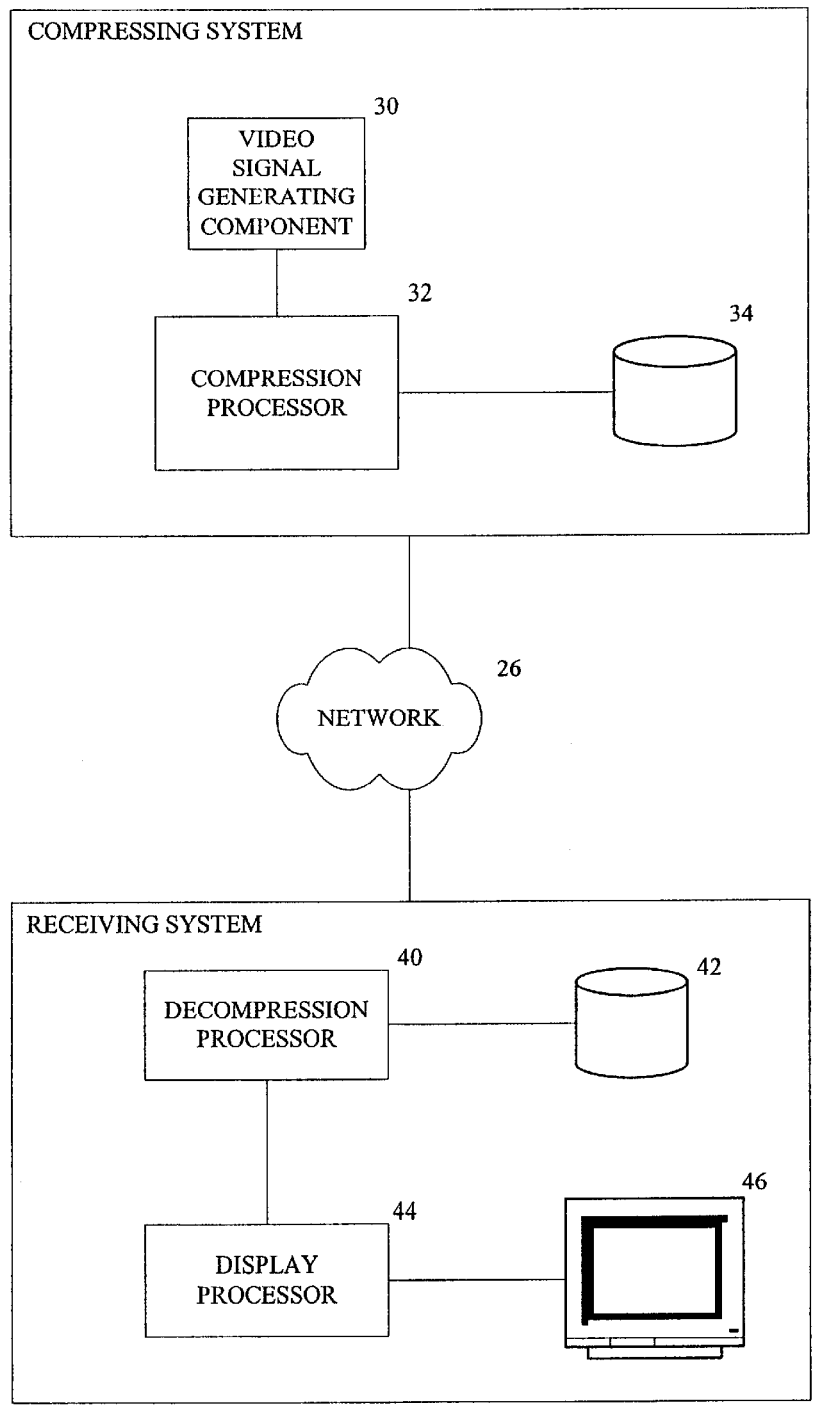
FIG. 1 is a block diagram of an example system for implementing the process of the present invention.

The present invention is a video image compression method implemented over a network. As shown in FIG. 1, an example system 20 for implementing the compression method of the present invention includes a compression system 24 and a receiving system 26 that is coupled to the compression system 24 through a network 26, such as the Internet.

The compression system 24 includes a video signal generating component 30 and an object database 34, both coupled to a compression processor 32. The video signal generating component 30 is a video production facility with multiple cameras, or a single camera. In an alternate embodiment, the video signal generating component 30 is coupled to the compression processor 32 over the network 26 or a separate network (not shown). The video signal generating component 30 may also be a video device that runs a videotape with a video image/signal stored thereon. The video signal generating component 30 generates a video signal, either analog (e.g. NTSC, PAL) or digital (e.g. MPEG, JPEG video). The compression processor 32 receives the analog or digital signal from the video signal generating component 30 and compresses the received image signal in accordance with the objects stored in the object database 34 and the compression scheme of the present invention. The compression scheme is described in more detail below.

The compressed video is then sent over the network 26 to the receiving system 28. The receiving system 28 includes a decompression processor 40 coupled to an objects database 42. The object databases 34 and 42 include same object information stored at identical addresses or by the same identifiers. The receiving system 28 further includes a display processor 44 coupled to the decompression processor 40 and a display 46. The decompression processor 40 decompresses the received compressed video signal in accordance with the compression scheme of the present invention and the objects stored in the object database 42. The decompression processor 40 then sends the decompressed video image to the display processor 44 which prepares the video image to the display 46.

Figures 2, 3:
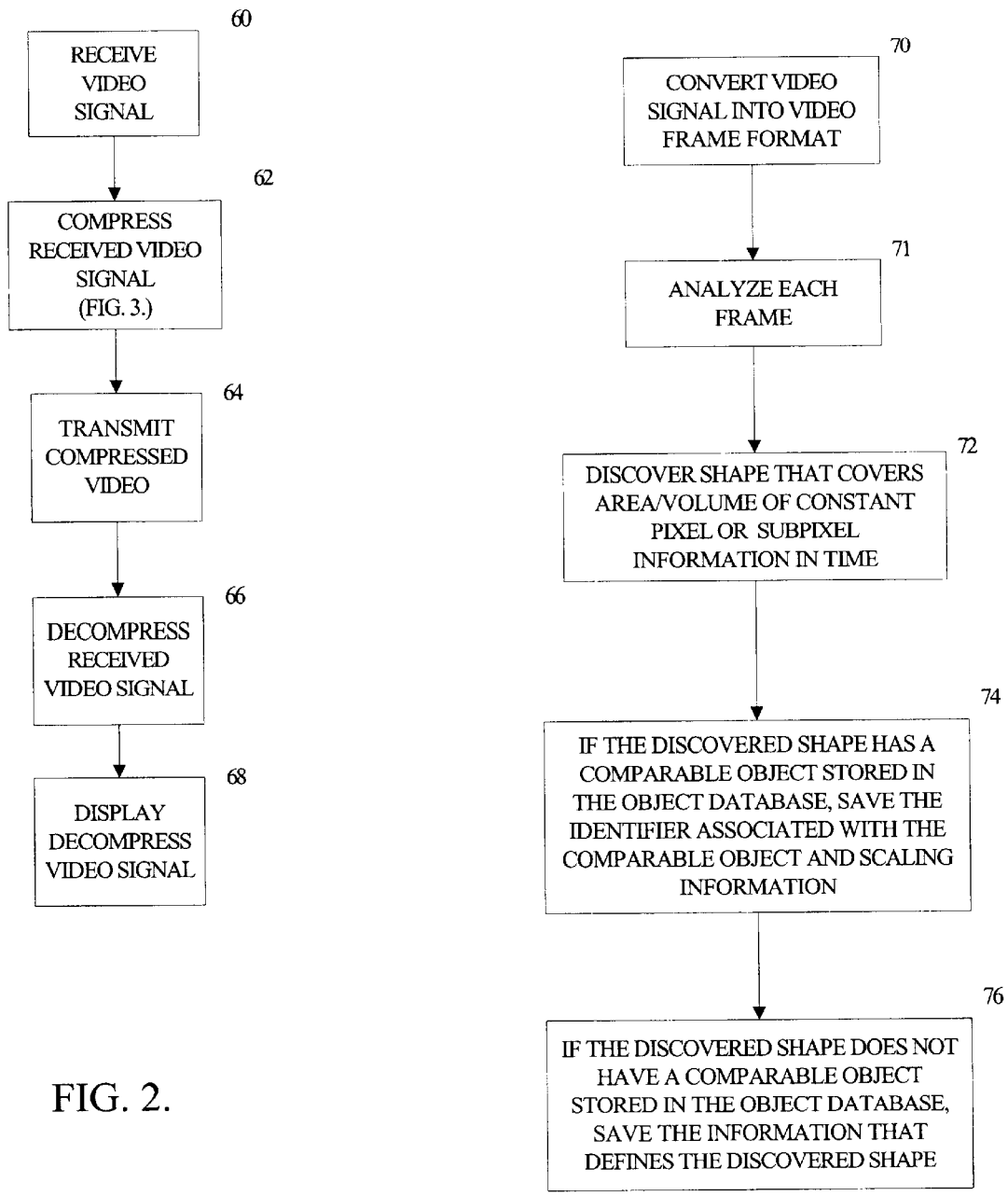
FIG. 2 is a flow diagram of the present invention performed by the system of FIG. 1.
FIG. 3 is a flow diagram of the compression technique of the present invention.
Figure 5A:
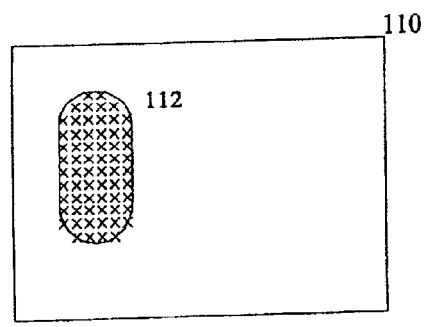
FIGS. 5A–E are progressive frame screen shots prior to compression.
Figure 5B:
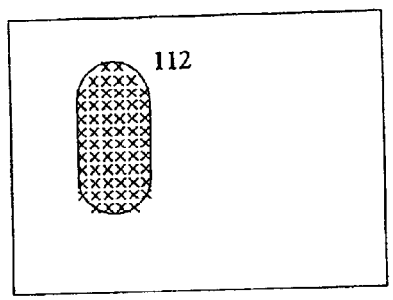
Figure 5C:
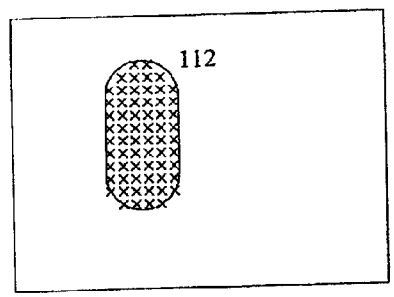
Figure 5D:
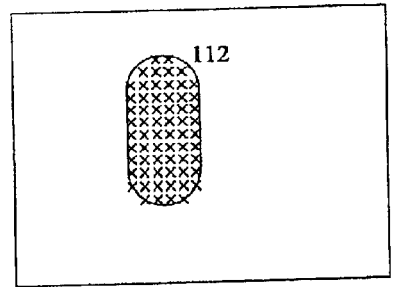
Figure 5E:
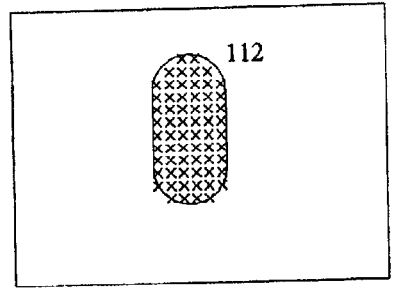

FIG. 2 is a flow diagram performed by the system 20 described above. First, at block 60, the compression processor 32 receives a video signal from the video signal generating component 30. Next, at block 62, the compression processor 32 compresses the received signal and transmits the compressed signal to the receiving system 28, see block 64. The compression process is described in more detail below in FIG. 3 and by the examples in FIGS. 4–7. At block 66, the decompression processor 40 decompresses the received video signal and the display processor 44 receives the decompressed video signal and displays the decompressed video signal, see block 68.

FIG. 3 is a flow diagram that illustrates the compression process performed at block 62 of FIG. 2. First, at block 70, the received video signal is converted into video frame format, if not already converted, For the purpose of this invention video frame format is the uncompressed format required by a display; each pixel's value is defined for each frame of the video image. Next, at block 71, each frame of the video signal is analyzed. The compression processor 32 analyzes the pixel elements red, green and blue of each pixel in successive frames. The analysis determines if groups of pixel elements with the same status exist over time. At block 72, the compression processor 32 discovers a shape area or volume that best encompasses each of the determined groups of pixel elements produced over the successive frames (i.e. over time). Then, at block 74, the compression processor 32 determines if the object database 34 includes a stored object (two-dimensional or three-dimensional) that is dimensionally comparable to the discovered shape. If it is determined that a comparable stored object exists, the location identifier of the determined comparable stored object is saved with information relating to the size of the discovered shape (i.e. scaling information time, width, depth). Then, at block 76, if the discovered shape does not have a comparable object stored in the object database 34, the discovered shape information is saved as the compressed image data. In an alternate embodiment, if a comparable object does not exist, an object corresponding to the discovered shape is created and saved in the object databases 34, 42.

FIGS. 4A–E illustrate a two-dimensional example of shape discovery from block 72 of FIG. 3. The compression processor 32 analyzes the frames of a frame formatted video signal. As part of the analysis, the compression processor 32 determines the status of pixel elements over time. The status is on or off. In one embodiment, of the frames are buffered in order to make the determination of the pixel element's status over time. In this example, the pixels include three color elements red (R), green (G), blue (B), (other types 3 of pixel elements can be used, such as cyan, magenta, yellow). The example illustrated in FIGS. 4A–E uses the R pixel element. FIG. 4A illustrates a frame 86 of the received video signal. FIGS. 4B–E show the status (X=on; O=off) of the R pixel elements for a portion 88 of the first line of pixels over frames 1–5. In this example, the only R pixel element information requiring compression is the X status pixel elements, because a O status pixel elements does not require a positive display command, since O is off (i.e. do not supply power). Only those pixel elements with an X status require a positive display command, since X is on (i.e. supply power).

The present invention then attempts to find a two-dimensional geometric shape that best represents the R pixel elements of status X over frames 1–5. The present invention tests various sized shapes in accordance with a number of shape discovery rules. In one embodiment, the shapes that are tested have various sample widths. Width is the number of pixel elements wide; a width of three means the R elements from three adjacent pixels on the same horizontal line of the frames. For example, in FIGS. 4C and 4D, sample widths of five and four are used, respectively. Then, for each sample width used, the present invention determines what shape is the most effective (i.e. covers the most X status pixel elements over time without including any O status pixel elements. Thus, for the sample width of five pixel elements of FIG. 4C, the corresponding shape 96 over the five frames covers five columns wide and two rows deep, thereby covering ten X status pixel elements. For the sample width of four pixel elements of FIG. 4D, the corresponding shape 98 over the five frames is four columns wide and three rows deep, thereby covering 12 X status pixel elements. As shown in FIG. 4E, not just square shapes but also triangles, like the triangle shape 100, parallelograms, circles or other geometric shapes are used to define pixel elements status over time. Once the best fitting shape is discovered, its dimensional information: width; number of frames it exists for; if a triangle, what the values are of at least two of the triangle's angles; or any other value needed to adequately describe the shape is saved in a message that represents the compressed video image. Also included in the message is the pixel element (RGB) the discovered shape is for and the status of the pixel elements contained within the discovered shape. This process is repeated until the original video image is fully represented by a series of messages. The compressed video signal then becomes a series of compressed video information messages. When the pixel element information of adjacent pixels is not disposed for the discovery of shapes, for example a single pixel element is on for several frames but no adjacent pixel elements are on during that time or, as shown in FIG. 4E, the X pixel element is not contained within a discovered shape, the triangle shape 100, that pixel element information is considered an error and ignored or that pixel element information is separately stored.

In order to compress the framed video signal even further, once a shape is discovered from the process described above, the compression processor 32 determines if there exists an object stored in the object database 34 that corresponds dimensionally to the discovered shape, see block 74 from FIG. 3. This search for a dimensionally comparable object can be performed a number of various ways. For example, objects are stored in some number of categorized banks of objects, such as a rectangle bank, a triangle bank, a circular bank. If the discovered shape was the triangle 100, the compression processor 32 knows it discovered a triangle and will therefore search the triangle bank for stored triangle objects that have a dimensionally comparable shape to the discovered triangle. "Dimensionally comparable" does not require an exact dimensional match (e.g. width to depth dimension or angle values), but one that would not result in a significant loss of information (i.e. most or all of the pixel elements contained within the discovered shape are also contained within the comparable object). If a stored object exists, the identifier or address associated with determined object is saved with dimension information (width, time or number of frames), the pixel element (RGB), and the status of the pixel elements contained within the shape.

Figure 6:
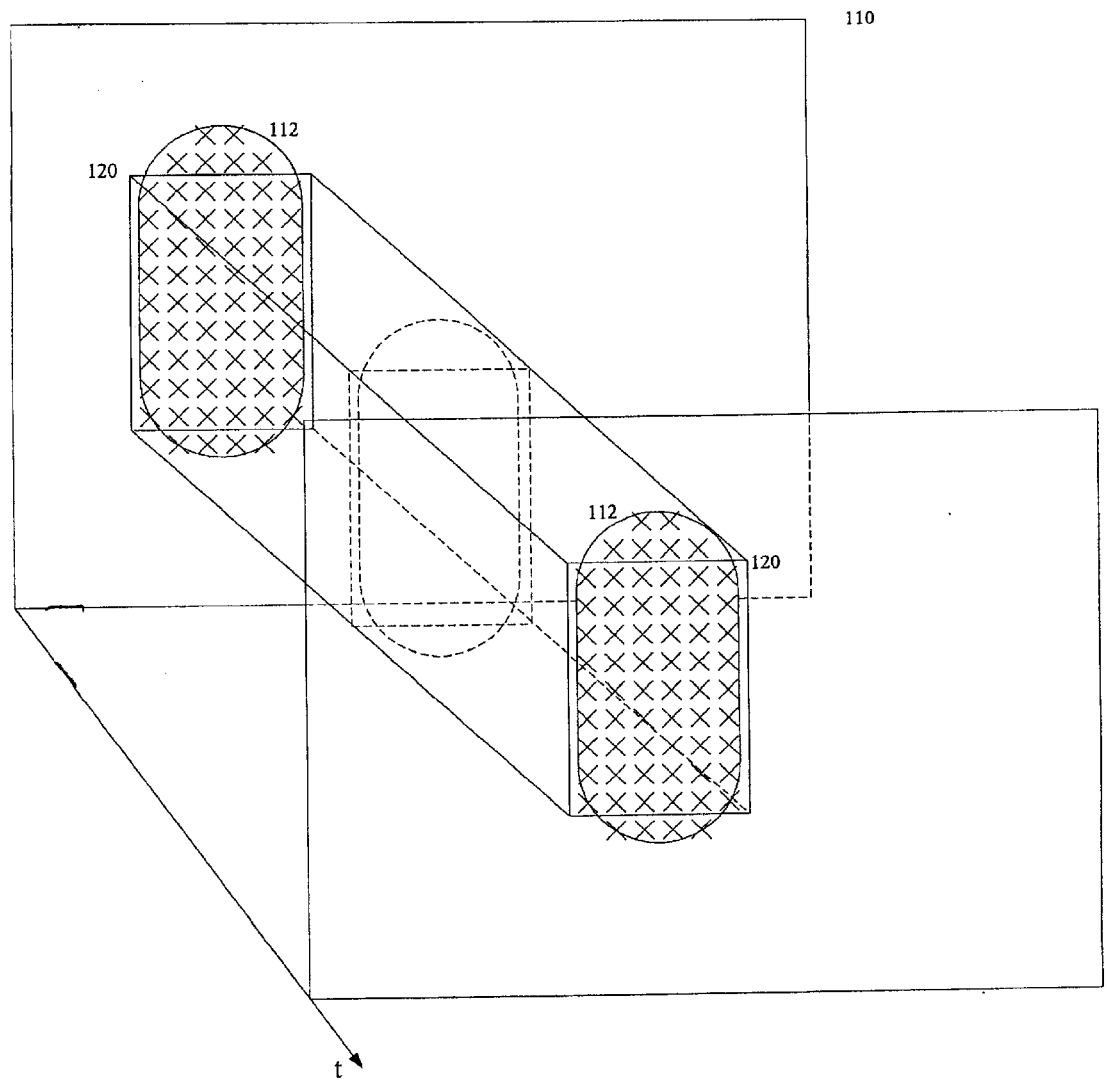
FIG. 6 is a three-dimensional representation of the progressive frame screen shots shown in FIGS. 5A–E.
Figure 7:
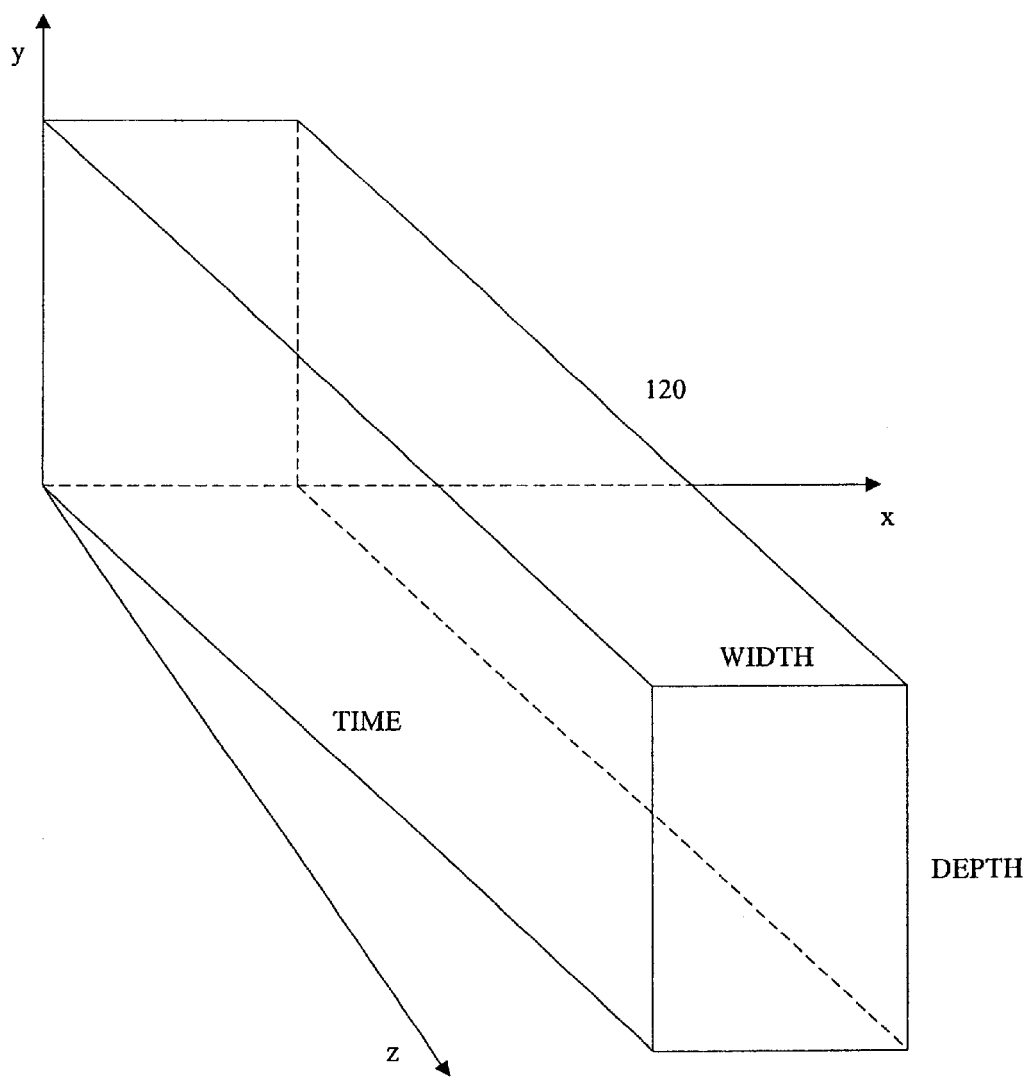
FIG. 7 is perspective view of a three-dimensional object discovered during the compression process for the three-dimensional frame representation of FIG. 6.

FIGS. 5–7 illustrate a three-dimensional embodiment of the present invention. The three-dimensional embodiment is performed similar to the two-dimensional embodiment except that a depth or y display axis is included at each frame. FIGS. 5A–E illustrate successive frames of a video image of an oval 112 that moves across the screen 110. In this example, the Xs represent the blue B pixel element that is on within the oval 112 as it progresses across the screen 110. Like the example described above for two-dimensions, as shown in FIG. 6, a shape 120 that best encompasses the B elements of the oval 112 as it moves across the screen 110 over time is discovered. However, in this example as an area of some width and depth moves over time a volume is produced, therefore the discovered shape will be a three-dimensional shape. As shown in FIG. 7, the discovered three-dimensional shape 120 includes an element width (x-axis on the display), an element depth (y-axis on the display), and a time or frame duration value. The compression processor 32 then searches for a dimensionally comparable three-dimensional object stored in the object database 34. In order to make the search easier, like the two-dimensional example above, the three-dimensional objects are stored in banks based on different base physical features. For example, there might exist a rectangular volume bank, a cylindrical bank, or a cone bank. If a dimensionally comparable three-dimensional object is found, then the same information object identifier, scaling information, status, and element that is stored for the two-dimensional example is stored with the inclusion of a depth value in the scaling information.

In an alternate embodiment, a single compressed message is used for all the elements of a group of pixels, provided all the pixel elements remain constant.

In a further embodiment, the compression processor 32 sends store messages for instructing the decompression processor 40 to store new objects in the receiving system's object database 42. If the compression processor 32 determines during shape discovery and object comparison that a discovered shape is very useful for describing the content of the video that is being compressed and that shape is not stored in the object database 34, the compression processor 32 saves the discovered shape in the object database 34 as a new object. Because the newly saved object is not stored in the receiving system's object database 42, the compression processor 32 sends a store message instructing the decompression processor 40 to store the new object in the receiving system's object database 42.

The decompression processor 40 of the receiving system 28 decompresses the received compressed video signal by translating the compressed video information messages into a format required by the display processor 44. If the received message includes the identifier or address for an object stored in the object database 42, the decompression processor 40 retrieves the object that corresponds to the identifier or address from the object database 42, scales it according to the scaling information included in the message and translates the scaled object into the format required to instruct the display processor 44 to paint the frames of the video on the display 46. Like other compression processors, e.g. MPEG, the translation of the compressed data creates data in the format required by the display processor 44.

While the preferred embodiment of the invention has been illustrated and described, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for compressing a video image, said method comprising:

determining value of one or more of the video image's pixels over time;

determining a shape that defines at least one group of pixels that are determined to have the same value for more than one video image frame;

retrieving an object from a memory of one or more stored objects that contains at least a portion of the plurality of pixels determined to have the same value for more than one frame; and saving information relating to the retrieved object and dimensional information of the determined shape, wherein the plurality of pixels is a three-dimensional object defined by a horizontal and vertical dimensions of the video image and the number of video image frames that the group of pixels remain at the same value.

2. The method of claim 1, further comprising:

transmitting the saved information to one or more receiving systems across a network.

3. The method of claim 2, wherein saving includes saving an identifier of the retrieved object for the portion of the plurality of pixels represented by the retrieved object.

4. The method of claim 3, further comprising:

receiving the transmitted information;

retrieving an object from local memory that corresponds to the identifier included in the transmitted information;

adjusting the retrieved object based on the transmitted information; and instructing a display processor according to the adjusted object.

5. The method of claim 1, further comprising:

generating an object store message if no object corresponds to the determined shape; and transmitting the generated object store message to one or more receiving systems across a network.

6. The method of claim 1, wherein the determined shape and objects in the stored objects are three-dimensional.

7. A system for compressing a video image, said system comprising:

an object database; and a compression processor coupled to the object database for receiving video image information, said compression processor comprising:

an image analyzer for determining values of one or more pixels of the video image over time;

a shape determiner for determining a shape that defines a plurality group of pixels that are determined to have the same value for more than one video image frame;

an object retriever for retrieving an object from the object database that contains at least a portion of the plurality pixels having the same value for more than one frame; and a saving component for saving information relating to the retrieved object and dimensional information of the determined shape, wherein the plurality of pixels is a three-dimensional object defined by a horizontal and vertical dimensions of the video image and the number of video image frames that the group of pixels remain at the same value.

8. The system of claim 7, wherein said compression processor further comprises:

a transmission component for transmitting the saved information to one or more receiving systems across a network.

9. The system of claim 8, wherein said compression processor further comprises an object store message generator for generating an object store message, if no object corresponds to the determined shape, and wherein said transmission component transmits the generated object store message to the one or more receiving systems across a network.

10. The system of claim 7, wherein the determined shape and objects in the stored set of objects are three-dimensional.

* * * * *